Sept. 7, 1948. T. T. GOLDSMITH, JR., ET AL 2,448,794
DEVICE FOR TESTING MAGNETIC MATERIALS
Filed June 4, 1943

Thomas T. Goldsmith Jr., INVENTORS
and Estle Ray Mann
BY
Charles W. Mortimer
ATTORNEY Patented Sept. 7, 1948

2,448,794

UNITED STATES PATENT OFFICE 2,448,794

DEVICE FOR TESTING MAGNETIC MATERIALS

Thomas T. Goldsmith, Jr., Cedar Grove, and Estle Ray Mann, Upper Montclair, N. J., assignors to Allen B. Du Mont Laboratories, Inc., Passaic, N. J., a corporation of Delaware Application June 4, 1943, Serial No. 489,652

4 Claims. (Cl. 175—183)

1

This invention relates to a device for testing materials. It is particularly useful in testing materials by examination of their magnetic properties or permeabilities. It is also useful for testing dielectric properties of materials.

In carrying out the invention, a high frequency oscillator is used to produce magnetic flux through a predetermined region. Modifying or modulating magnetic flux may be supplied to the same region by utilizing a source of low frequency power such as the 60-cycle current in common use. Modulation may also be effected by supplying suitable voltages where desired.

In one embodiment the oscillator and power source are connected, respectively, to coils so arranged that the high frequency oscillations are modulated by the low frequency alternations in accordance with the magnetic properties of specimens under test. The specimens are tested by being used as cores of the coils. The coils are connected, respectively, to the high frequency and the low frequency sources of current.

The invention may be understood from the description in connection with the accompanying drawings, in which.

Figure 1:
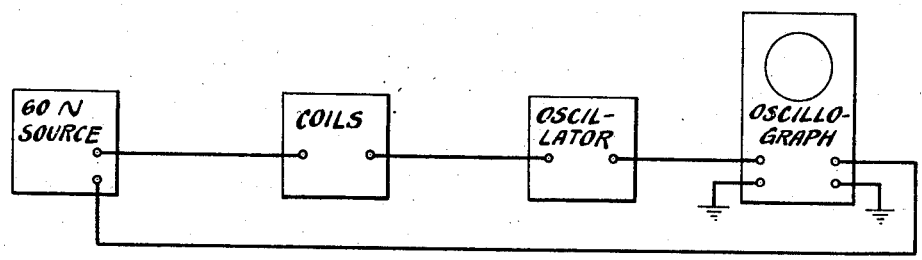
Fig. 1 is a block diagram of elements of the device.

In Fig. 1 of the drawings, the several blocks are labeled to designate what they represent.

Figure 2:
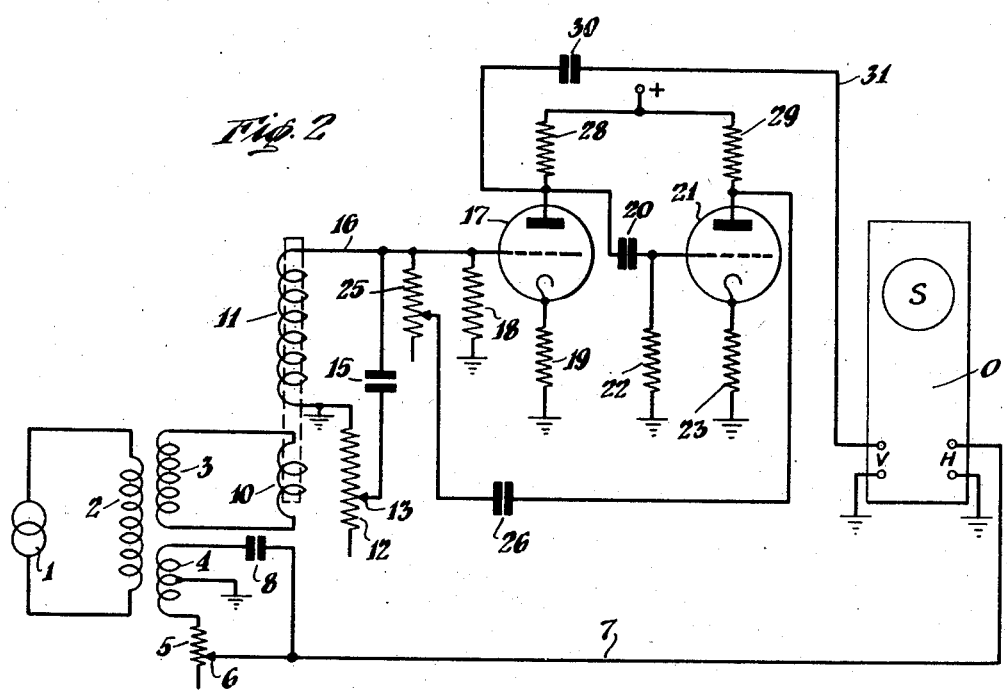
Fig. 2 is a diagram of one embodiment of electrical connections.

In Fig. 2, reference character 1 indicates a source of alternating current which may be 60 cycles per second. It is connected to the primary 2 of a transformer that has two secondaries 3 and 4. The coil 4 is grounded near its center. One end thereof is connected to resistor 5, that is provided with a sliding contact 6 connected by lead 7 to one terminal of the horizontal deflecting system H of the oscillograph O, the other terminal thereof being grounded. The other end of coil 4 is connected through condenser 8 to the lead 7. The sliding contact 6 on resistance 5 and condenser 8 provide a phase-shifting device for the voltage applied to the system H of the oscillograph O.

The secondary 3 is connected to a coil 10 that is adapted to be coupled with the coil 11 through the medium of the specimen to be tested. One end of coil 11 is connected to a resistance 12 that is provided with an adjustable contact 13 which is coupled by condenser 15 to the other end of coil 11. The condenser 15 is essentially in parallel

2 with the coil 11 to produce resonance. A lead 16 extends from one end of coil 11 to the grid of tube 17, which is provided with a grid leak 18. The cathode of this tube is biased by resistance 19.

The plate of tube 17 is coupled by condenser 20 to the grid of tube 21, which is provided with grid leak 22. The cathode of tube 21 is also biased by resistance, as shown at 23.

The grid of tube 17 is connected through adjustable resistance 25 and condenser 26 to the plate of tube 21. Resistances 28 and 29 are provided in the usual way between a source of positive potential and the plates of tubes 17 and 21. The tubes 17 and 21 and the connections described constitute an oscillator with regenerative feedback.

The plate of tube 17 is coupled through condenser 30 and lead 31 to one terminal of the vertical deflection system V of the oscillograph O, the other terminal thereof being grounded.

Figure 3:
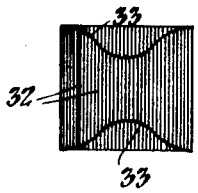
Figs. 3, 4 and 5 are illustrative cyclographs obtained with the device.

The operation is as follows:

Low frequency alternating current is applied from source 1 through transformer 2–3 to the coil 10, and potential is applied to the plates of tubes 17 and 21. Low frequency potential is also applied to coil 4. Under these conditions low frequency waves are applied through lead 7 to the horizontal deflecting system H of the oscillograph and high frequency waves from the oscillator are applied through lead 31 to the vertical deflecting system V thereof. The coil 10 reacting with coil 11 causes the high frequency oscillations or waves indicated at 32 in Fig. 3 to be modulated by the low frequency wave as indicated by the curves 33 when no magnetic material is in the coils 10 or 11.

Figure 4:
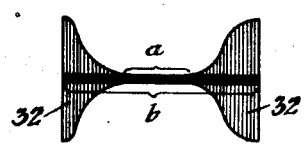

When a standard specimen of material that has magnetic properties is placed as a core in the coils 10 and 11, the increase of flux causes the cyclogram to change, for example, into that shown in Fig. 4. This cyclogram shows at $a$ and $b$ that there are two minima per low frequency cycle in the amplitude of the oscillator when there is magnetic material in the coils 10 and 11. The second minimum is more pronounced the more saturation there is in the permeable material.

Figure 5:
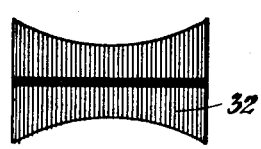

When a candidate specimen of like shape and size as the standard is to be tested it replaces the standard specimen as a core in the coils 10 and 11. The cyclogram changes if the specimen being examined differs in magnetic properties from the standard. For example, Fig. 5 shows a cyclogram obtained using a specimen of steel like that used in obtaining the cyclogram of Fig. 4, except that the carbon content and therefore the permeability was different.

While a grid-modulated self-oscillating circuit has been shown, other conventional methods of modulation such as, for example, plate modulation of an amplifier tube carrying oscillating signals from any convenient frequency source, may be used in this invention.

In the specific embodiment of Fig. 2, when the sample under test is inserted in coils 10 and 11 the low frequency signal from coil 10 is coupled to the coil 11. At the same time the sample under test reacts directly to control the amplitude of the high frequency oscillations. The sample under test can be made to exhibit its low frequency saturation effects as a modulation of a higher frequency amplitude.

In practice, the coils 10 and 11 and the condenser 15 are chosen to match the specific characteristics of given samples. The equipment is arranged for rapid substitution of other sets of coils and condensers to match new samples.

In order to obtain the most sensitivity of the pattern, such as indicated by Fig. 4 or Fig. 5, it is desirable to adjust the strength of low frequency current applied to coil 10 and to adjust the amount of feed-back contributed by resistor 25. The adjustment of resistor 5 shifts the low frequency phase of the horizontal scanning so as to produce easily interpreted patterns of the minima in the cyclograms.

The choice of the resonant frequency determined by coil 11 and condenser 15 influences the nature of the cyclogram pattern. If the entire body of a sample is to be inspected down to the center than relatively low frequencies are employed. For example, generator 1 may be 60 cycles and the resonant frequency determined by coil 11 and condenser 15 may be 1000 cycles. However, if the surface conditions are of main interest, then one employs a coil 11 and condenser 15 which resonates at a high frequency, such as 20,000 cycles, thus detecting skin effects of the specimen.

While the application of the modulating signals by means of the coupling from coil 10 to coil 11 is illustrated in Fig. 2, it is desirable in some cases to so apply the modulating signal that the low frequency flux is not applied directly to the sample under test. For example, a modulating voltage may be inserted in the plate supply of tubes 17 and 21 by connection of a transformer secondary between the point marked + and the common lead for resistances 28 and 29. The modulating signals may be inserted elsewhere in the circuit.

The cathode-ray tube provides a convenient means of observing and interpreting the modulation effects. However, any other means of measuring and interpreting the modulation may be employed, such as, for example, a rectifier and meter.

Where it is desired to measure the dielectric properties of a material, the material is used as the dielectric medium of the condenser 15 so that the dielectric losses may be interpreted in terms of the amplitude of oscillation.

In view of the fact that the heat treatment used for hardening steel products changes the carbon content, which results in change of magnetic properties, this invention is suitable for measuring the depth or extent of case hardening of steel products by comparing samples with standard specimens.

Pieces of material may also be tested in accordance with this invention which are slightly different in chemical content. Also pieces having slightly different sizes, but otherwise uniform as to chemical composition and heat treatment, may be tested.

What is claimed is:

1. A device for testing specimens of magnetic materials by examining their magnetic properties, which comprises a high frequency vacuum tube oscillator having an inductance coil in the oscillator circuit thereof with a condenser in parallel with said coil, one end of said coil and the corresponding side of said condenser being grounded, an inductance coil aligned with said first named coil, said coils being adapted to be coupled magnetically by the specimens of material to be tested, means to produce low frequency oscillations in said second named inductance coil and an oscillograph having one set of deflection plates connected to the output of said high frequency oscillator and another set of deflection plates connected to said means which produces low frequency oscillations whereby a visible pattern is produced on said oscillograph which is characteristic of the magnetic properties of said material.

2. In a device for testing specimens of magnetic material by alternating magnetic flux, a high frequency oscillator which comprises two vacuum tubes each having its plate coupled to the control grid of the other, a tank circuit comprising a condenser and an inductance coil in parallel connected to the control grid of one of said tubes, said coil being adapted to receive a specimen of the metal to be tested, a source of low frequency current having an inductance coil connected thereto, two inductance coils located in inductive relation to said last named coil, an oscillograph having a deflection system to which one of said two coils is connected and having a different deflection system to which the output of said oscillator is connected, and a coil having its ends connected respectively to the ends of said other one of said two coils and being aligned with said tank inductance coil and also being adapted to receive specimens of the material to be tested.

3. The device of claim 2 in which a phase shifter is located between said first named deflection system and the coil to which it is connected.

4. The device of claim 2 in which a variable resistance is located in said tank circuit.

THOMAS T. GOLDSMITH, JR.
ESTLE RAY MANN.

REFERENCES CITED

The following references are of record in the file of this patent:

UNITED STATES PATENTS

| Number | Name | Date |
| --- | --- | --- |
| Re. 22,150 | Bagno et al. | Aug. 4, 1942 |
| 1,301,525 | Van Der Bijl | Apr. 22, 1919 |
| 1,686,815 | Imes | Oct. 9, 1928 |
| 1,743,087 | Kingsley | Jan. 7, 1930 |
| 1,984,465 | Dana | Dec. 18, 1934 |
| 2,005,011 | Specht | June 18, 1935 |
| 2,010,189 | Hallowell, Jr. | Aug. 6, 1935 |
| 2,214,625 | Peterson | Sept. 10, 1940 |
| 2,258,837 | Zuschlag | Oct. 14, 1941 |
| 2,280,226 | Firestone | Apr. 21, 1942 |
| 2,329,811 | Zuschlag | Sept. 21, 1943 |